United States Patent [19]

Parsons

[11] Patent Number: 5,647,591

[45] Date of Patent: Jul. 15, 1997

[54] RAPID MOUNT CONNECTING SYSTEM FOR BATON ACCESSORIES

[75] Inventor: Kevin L. Parsons, Appleton, Wis.

[73] Assignee: Armament Systems and Procedures, Inc., Appleton, Wis.

[21] Appl. No.: 421,088

[22] Filed: Apr. 13, 1995

[51] Int. Cl.⁶ .............................. A63B 15/02; F21L 1/00
[52] U.S. Cl. ..................... 463/47.4; 362/102; 403/314; 403/320
[58] Field of Search .............. 273/84 R, 84 ES; 473/298; 135/65, 66, 76, 910; 403/314, 308, 320, 350, 315, 342; 362/102

[56] References Cited

U.S. PATENT DOCUMENTS

| | | | |
|---|---|---|---|
| 271,143 | 1/1883 | Smith | 403/350 |
| 965,131 | 7/1910 | Bliss | 403/350 |
| 1,282,341 | 10/1918 | White | 403/349 |
| 3,737,649 | 6/1973 | Nelson et al. | 362/102 |
| 4,212,559 | 7/1980 | Persson | 403/348 |
| 5,060,123 | 10/1991 | Arnold | 362/102 |
| 5,086,377 | 2/1992 | Roberts | 362/102 |
| 5,287,255 | 2/1994 | Strodtman | 362/102 |
| 5,363,285 | 11/1994 | Wideman | 362/102 |
| 5,381,319 | 1/1995 | Shiao | 135/910 |

*Primary Examiner*—William M. Pierce
*Attorney, Agent, or Firm*—Robert C. Curfiss; Mark A. Tidwell; Butler & Binion, L.L.P.

[57] ABSTRACT

A quick-connect, universal connecting system for rapidly mounting accessories on law enforcement batons for providing ready access to full capacity equipment while not increasing the amount of equipment to be carried by law enforcement personnel. The connecting system includes an accessory connector having two components adapted to be attached separately to the baton or accessory and secured together by a pin and socket connection. The pin and socket connection defines a bayonet-type locking mechanism for rapid connection and disconnection with less than one turn thereby allowing an officer to quickly assemble the accessory and baton as an approach is made. The locking mechanism includes a spiral shaped channel which continues to tighten the connection between the pin and the socket as it wears.

13 Claims, 2 Drawing Sheets

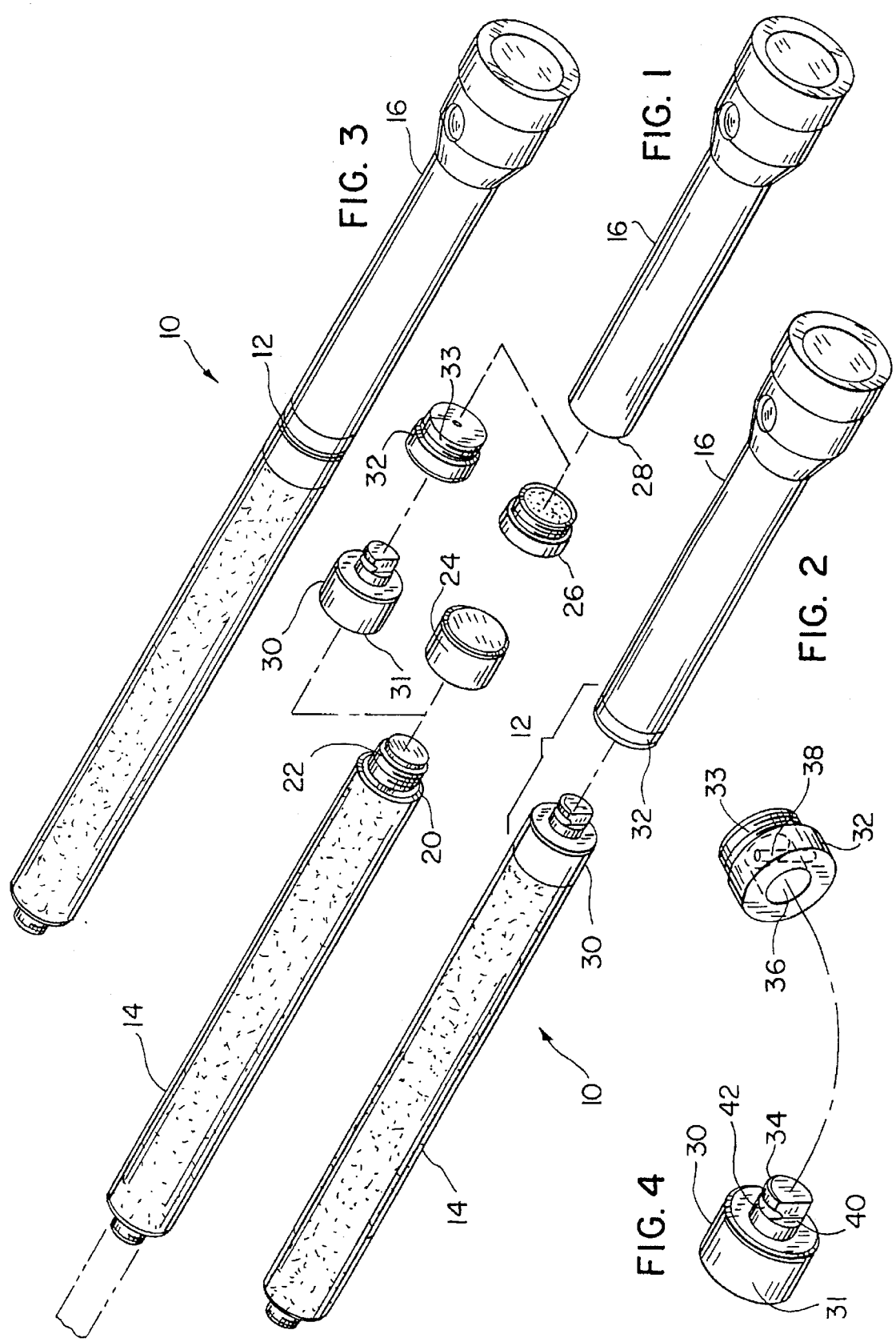

5,647,591

RAPID MOUNT CONNECTING SYSTEM FOR BATON ACCESSORIES

BACKGROUND OF INVENTION

1. Field of Invention

The subject invention is generally related to nightsticks, batons and intermediate force weapons and is specifically directed to a connecting system for rapidly mounting accessories on a baton used by a law enforcement officer.

2. Description of the Prior Art

Nightsticks and batons are well known and have gained widespread acceptance as intermediate force weapons for use by law enforcement personnel. One of the best known intermediate force weapons is the ASP Expandable Baton manufactured by Armament Systems and Procedures, the assignee of the subject application. Typically, the ASP Baton includes three telescoping sections, the outer largest section defining a handle adapted for receiving and nesting the remaining sections when the baton is in a collapsed position.

In addition to nightsticks or batons, law enforcement personnel are required to carry or have available other weapons and accessories for other uses, such as searches or riot control. Typically, law enforcement personnel carry portable two-way radios, firearms, ammunition, handcuffs, chemical irritants and flashlights, in addition to the intermediate force baton. When all of this equipment is positioned on the belt of the officer or elsewhere on his uniform, it adds substantially to the weight of the uniform and at times can become quite cumbersome.

In an effort to reduce the weight requirements, there has been a continuing move toward lighter weight equipment without sacrificing function. For example, many uniforms now have nylon issue belts rather than leather and the two-way radios have routinely become smaller and lighter in weight with the continuing development of solid state electronics. In addition, multi-implement products have become popular for providing two implements that an officer commonly uses and may need in hand at the same time without undesirably increasing the large amount of equipment already carried on the person.

While it is desirable to provide an officer with ready access to two commonly used implements at the same time, a disadvantage of the prior art multi-implement products is that if the product is small enough to carry as one unit, the capacity of each implement may be too small to be used effectively. Alternatively, if each implement of the multi-implement product is at its full capacity, then the unit may be too large to carry on the belt of the officer or elsewhere on his uniform.

An example of a multi-implement product which can be quickly and easily assembled to provide a full capacity riot baton is shown in Applicant's Expandable Baton with Coupler, Ser. No. 08/129,901 now U.S. Pat. No. 5,407,197. The coupler disclosed therein is designed to join two serviceable expandable batons together to create a full size riot baton. Because a standard issue duty baton forms the basis for the riot baton, law enforcement personnel have ready access to a riot control device without having to carry cumbersome additional equipment such as a traditional riot baton.

However, while such a coupler works well where the officer has time to prepare for use, it is not as effective where any of a number of accessories may have to be deployed in a quick response manner.

Therefore, there is a need for a quick-connect, universal connector for quickly and easily mounting accessories on a law enforcement baton to provide an officer with a variety of full size implements which are commonly used and may be needed at the same time, without interfering with or reducing the effectiveness of the accessory as a stand alone tool.

SUMMARY OF THE INVENTION

The subject invention is directed to a quick-connect, universal coupling connecting system for rapidly mounting accessories on a law enforcement baton thereby providing ready access to full capacity equipment while not increasing the amount of equipment to be carried by law enforcement personnel. The connecting system is designed to be attached to existing law enforcement issue batons and accessories so that no modifications or new equipment is necessary. The invention is specifically designed for rapid connection and disconnection allowing an officer to quickly assemble the accessory and baton as an approach is made.

In the preferred embodiment, the connecting system includes an accessory connector having a first component and a second, separate component. The first component is adapted to be readily secured to the end of a law enforcement baton and the second component is adapted to be readily secured to an accessory, such as a flashlight, chemical irritant dispenser, an additional baton or other accessories commonly used by law enforcement personnel.

The accessory connector is designed to be attached to existing police issue equipment and requires no modifications. Typically, the closed end of the handle of the police issue baton includes an externally threaded end and a removable endcap for covering the threaded end. In the preferred embodiment, the accessory to be connected to the baton may include an internally threaded end with a removable endcap. One of the components includes an internal thread for engaging the externally threaded end of the baton. The other component includes an externally threaded end for engaging the internally threaded end of the accessory.

In use, the endcaps are removed and the components of the accessory connector are secured to the baton and accessory in place of the endcaps. For example, once a baton is fitted with the universal accessory coupler of the present invention, any number of accessories modified with the mated coupler may be readily attached to the baton. The mated coupler may be custom designed for each accessory. This provides a universal accessory coupling system.

The first and second components of the subject invention include a first locking element and a second, compatible locking element, respectively. In the preferred embodiment, the first and second locking elements are a pin and a socket designed to be selectively secured to each other in an interlocking relationship to join the baton and accessory and create a multi implement product. The pin and socket connection defines a locking mechanism which provides a solid lockup when connected and allows attachment in the dark.

In the preferred embodiment, the locking mechanism is a bayonet-type mounting, requiring less than a full turn to lock the mechanism, in which the connection is quickly and easily secured by inserting the pin into the socket and partially rotating the pin and socket into locking engagement with one another. Likewise, the bayonet-type mounting allows the pin and socket to be quickly and easily disconnected in less than one turn. The bayonet-type locking mechanism is formed by the engagement of an interior radial bar intersecting a sector of the socket and a channel in the pin adapted to receive the bar. The connection is made when the pin and socket are engaged and rotated relative to one another causing the bar to be wedged into locking engagement with the channel.

It is an important feature of the subject invention that the locking mechanism includes a spiral lock which is forgiving and continues to tighten as it wears. In the preferred embodiment, the channel in the pin is on an incline relative to the axis of the pin and has a spiral shape of continuous increasing diameter. Each time the pin and socket are rotated into locking engagement with each other, the spiral shape forces the bar to further wedge into the channel thereby tightening the lock between the two components as the accessory connector is used and the components wear over time.

In the preferred embodiment, the component including the pin is attached to the baton and the component including the socket, or a plurality of socket components, may be attached to a variety of accessories which can all be fit to the same pin for rapidly mounting any one of the accessories to the baton. Where the accessory is a component having rechargeable batteries, such as a rechargeable flashlight or the like, it is necessary to provide a weep hole at the end of the shaft to avoid pressure build-up caused by the gas build-up within the battery chamber. Thus, the component to be secured to the accessory includes a relief hole for allowing hydrogen gas to escape from the rechargeable batteries.

In addition, it should be noted that when the pin and socket are disconnected and the accessory and baton are carried separately, there are no sharp edges to wear the officer's clothing or cut a subject. Also, while the components in the preferred embodiment are threadably secured to the accessories and baton, the subject invention may include universal coupling components which are designed to be an integral part of the items to be connected. Thus, a baton may incorporate a pin at the end of the handle and a variety of accessories may be designed to include a corresponding socket for quickly connecting such accessories to the baton or vice versa.

Therefore, it is an object and feature of the subject invention to provide a quick-connect, universal connecting system for rapidly mounting accessories on an existing law enforcement baton to provide ready access to full capacity equipment without requiring modifications or new equipment.

It is another object and feature of the subject invention to provide a connecting system comprising a connector having a first component adapted to be readily attached to the baton and a second component adapted to be readily attached to the accessory.

It is a further object and feature of the subject invention to provide a connector with first and second components having locking elements designed to be selectively secured to one another in an interlocking relationship to join the baton and accessory.

It is yet another object and feature of the subject invention to provide a connector in which the locking elements are a pin and socket connection which define a bayonet-type locking mechanism for rapidly connecting and disconnecting the elements in less than one turn.

It is a further object and feature of the subject invention to provide a connector having a pin locking element which includes a spiral shaped channel which is forgiving and continues to tighten the connection between the post and the socket as it wears.

Other objects and features will be readily apparent from the accompanying drawings and description.

BRIEF DESCRIPTION OF THE DRAWINGS

FIG. 1 is a perspective view of a police baton including an exploded view of the endcap removed from the bottom portion of the handle to expose an externally threaded end with the telescoping baton extending from the opposite end (partially shown in phantom) and the endcap removed from the bottom portion of the flashlight and illustrating the placement of the post and socket components to be connected to the baton and flashlight, respectively.

FIG. 2 is a perspective view of the police baton with the pin component secured to the baton and the socket component secured to the flashlight prior to connecting the pin and socket in locking engagement with one another to join the baton and flashlight.

FIG. 3 is a perspective view of the baton and flashlight joined together by the accessory connector.

FIG. 4 is an enlarged perspective view of the components of the accessory connector showing the locking mechanism for securing the components to each other including a ledge and a channel on the pin and a bar intersecting an interior section of the socket (in phantom) so that, in use, the pin is received into the socket and rotated into the channel for securing the two components to each other.

DETAILED DESCRIPTION OF THE DRAWINGS

Figure 5:
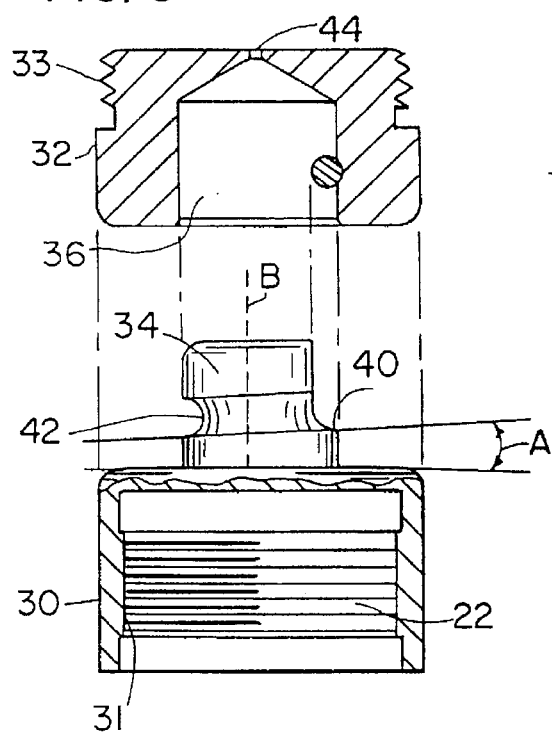
FIG. 5 is an enlarged cross-sectional side view of the pin and socket components of the accessory connector prior to be secured to one another and showing the ledge and inclined channel of the pin and the bar in the socket.

Referring to FIGS. 1–3, the quick-connect, universal connecting system of the subject invention for rapidly mounting accessories on a law enforcement baton is generally designated by the numeral 10. The universal connecting system 10 includes an accessory connector 12 adapted to join a law enforcement baton 14 to an accessory, such as by way of example, a flashlight 16. While a flashlight is illustrated herein, it will be understood that a variety of police accessories, such as chemical irritant dispensers, additional batons and the like, may be used in connection with the subject invention.

As shown in FIG. 1, the closed bottom portion of the handle 20 of the police issue baton 14 includes an externally threaded end 22 and a removable endcap 24. Also, the closed bottom portion of the flashlight 16 includes a removable endcap 26 and an internally threaded end 28. The accessory connector 12 includes a first component 30 and a second component 32. In the preferred embodiment, the first component 30 includes an internal thread 31 for engaging the externally threaded end 22 of the baton and securing the first component 30 to the baton. The second component 32 includes an externally threaded end 33 for engaging the internally threaded end 28 of the flashlight and securing the second component thereto. As shown in FIGS. 1 and 2, the endcaps 24 and 26 are removed and the components 30 and 32 are secured in their place.

The first and second components 30, 32 of the subject invention include a first locking element and a second, compatible locking element for securing the components to each other to join the baton 14 and the flashlight 16. In the preferred embodiment, the first locking element is a pin 34 and the second locking element is a socket 36. As shown in FIG. 4, the elements are connected by inserting the pin 34 of the first component 30 into the socket 36 of the second component 32.

The pin 34 and socket 36 of the preferred embodiment are uniquely designed to be selectively secured to each other in an interlocking relationship which is easily connected and disconnected. When the pin and socket are interlocked, the connector 12 forms a sturdy, reliable, smooth connection with extreme strength between the flashlight 16 and the baton 14 (see FIG. 3). In fact, the connection formed by the universal connector 12 appears and performs as if the baton and flashlight were a single integral unit, not two separate implements connected together.

Figure 6:
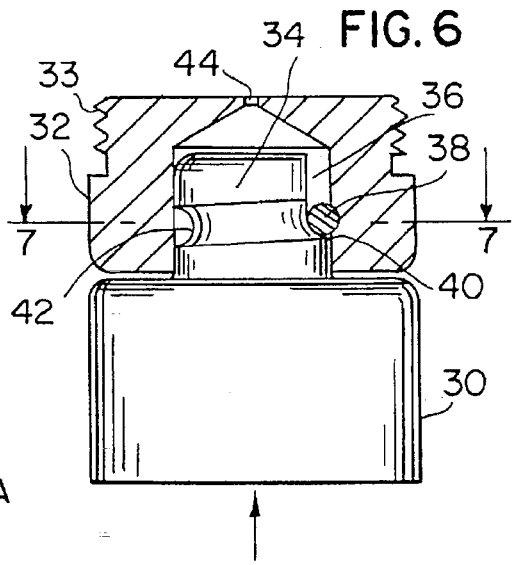
FIG. 6 is an enlarged cross-sectional side view of the pin and socket components as initially engaged with the bar of the socket in contact with the ledge of the post.

In the preferred embodiment, the locking mechanism formed by the pin and socket connection is a bayonet-type mounting in which the components are quickly and easily locked together by inserting the pin 34 into the socket 36 and rotating them relative to one another. Similarly, the components are quickly and easily disconnected in less than one turn. As shown in FIGS. 4-6, the socket 36 includes a radial bar 38 intersecting a sector of the socket and the pin 34 includes a ledge 40 and a channel 42 adapted to receive the bar 38.

As best seen in FIGS. 5 and 6, when the pin 34 is inserted into the socket 36, the bar 38 initially engages and rests on the ledge 40. The width of the channel 42 adjacent to the ledge 40 is adapted to receive the bar 38. In order to secure the components to each other, the pin 34 and socket 36 are rotated relative to each other thereby forcing the bar 38 into locking engagement with the channel 42 (see FIG. 8). Further, it is an important feature of the subject invention that the locking mechanism includes a spiral lock which is forgiving and continues to tighten as it wears.

Figure 7:
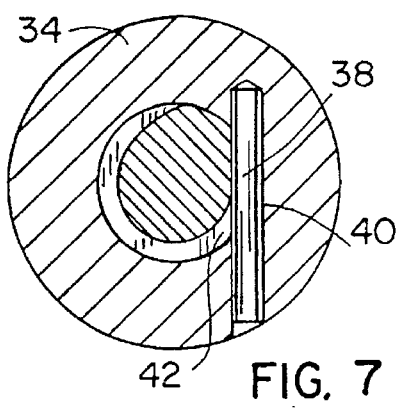
FIG. 7 is a cross-sectional view taken along line 7—7 of FIG. 6 showing the bar positioned against the ledge and the spiral shape of the channel adjacent to the ledge and adapted to receive the bar.
Figure 8:
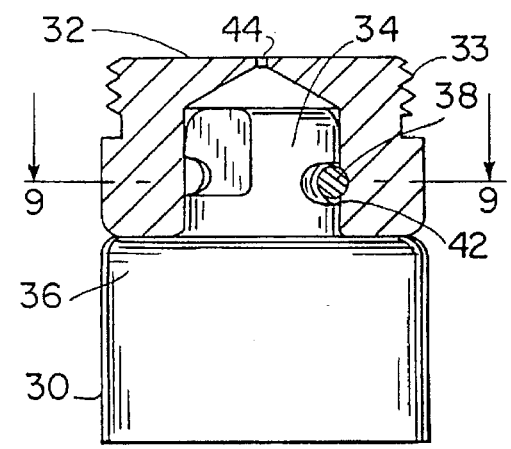
FIG. 8 is an enlarged cross-sectional side view of the pin and socket components as rotated into locking engagement with one another so that the bar of the socket has been rotated into the channel of the post.
Figure 9:
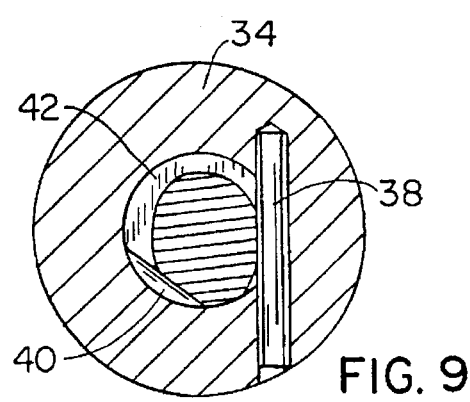
FIG. 9 is a cross-sectional view taken along line 9—9 of FIG. 8 showing the bar positioned in the spiral shaped channel after the pin and socket are rotated into locking engagement with one another.

As shown in FIGS. 7 and 9, the channel 42 in the pin 34 has a spiral shape of continuous increasing diameter. In addition, as best seen in FIG. 5, the channel 42 is positioned at an inclined angle A relative to the axis B of the pin 34. As the pin and socket are rotated relative to one another, the bar 38 rides down the inclined channel 42 thereby forcing the pin and socket into locking engagement with each other with increasing force. Further, as the channel 42 continues to spiral around the pin 34 at a downward angle A, the decreasing width of the channel causes the bar to become wedged in the channel, as the pin and socket are rotated relative to one another, thereby securely locking the components together. Thus, with repeated use and wearing of the channel, the spiral shape forces bar to wedge further into the channel thereby tightening the connection so that the quick-connect, universal connecting system improves with time instead of deteriorating.

Where the accessory is a item having rechargeable batteries, the component 32 to be attached to the accessory, such as flashlight 16, may include a relief hole 44 for allowing hydrogen gas to escape from the battery chamber. As shown in FIGS. 5, 6 and 8, the socket component 36 which is attached to the flashlight 16 includes the relief hole 44. Thus, the preferred embodiment of the subject invention provides a universal connecting system including a pin and socket bayonet-type locking mechanism with a unique spiral shaped channel 42 in the pin to rapidly and securely mount a variety of accessories to batons carried by law enforcement personnel.

While specific embodiments and features of the invention have been disclosed herein, it will be readily understood that the invention encompasses all enhancements and modifications within the scope and spirit of the following claims.

What is claimed is:

1. An accessory connector in combination with a law enforcement baton and an accessory, the accessory connector adapted for mounting an end of the accessory on an end of the law enforcement baton, said connector comprising:

a. a first component adapted to be secured to one of said ends and having a first locking element, wherein said first locking element comprises a socket, said socket having a radial bar disposed therein; and b. a second component adapted to be secured to the other of said ends and having a second, compatible locking element, wherein said second locking element comprises a pin adapted to be received in said socket such that together the pin and socket define a locking mechanism, wherein said pin is defined by an axis extending along the length of the pin and said pin has a channel adapted to receive the bar, wherein said channel is on a spiraling incline relative to the axis of the pin, and wherein said second locking element may be selectively secured and unsecured in an interlocking relationship with said first locking element to rapidly connect and disconnect baton and the accessory.

2. The baton, accessory and accessory connector combination of claim 1, said pin further including a ledge, wherein said channel is in communication with the ledge and wherein said bar engages the ledge when the pin is inserted into the socket and is received into locking engagement with said channel as the pin and socket are rotated relative to one another.

3. The baton, accessory and accessory connector combination of claim 1, wherein said channel has a spiral shape of continuous increasing diameter such that as the pin and socket are rotated into locking engagement with one another, the spiral shape causes the bar and channel to engage each other with increasing locking force.

4. The baton and detachable accessory combination assembly of claim 1, wherein the component secured to the baton includes a pin and the component secured to the accessory includes a socket.

5. The baton and detachable accessory combination of claim 4, wherein the accessory is an implement including rechargeable batteries.

6. The baton and detachable accessory combination of claim 5, wherein the socket component to be connected to the implement further includes a relief hole for allowing gas to escape from the rechargeable batteries.

7. The baton and detachable accessory combination of claim 6, wherein the implement is a rechargeable flashlight.

8. A law enforcement baton in combination with an accessory connector and a detachable accessory, said baton combination comprising:

a. a law enforcement baton having an externally threaded end;

b. an accessory having an externally threaded end;

c. an accessory connector having a first component adapted to be secured to one of said ends and having a first locking element, wherein said first component includes an internal thread adapted to engage the external threads of one or said ends; and a second component adapted to be secured to the other of said ends and having a second, compatible locking element, wherein said second component includes an internal thread adapted to engage the external threads of the other of said ends, wherein the second locking element may be selectively secured in an interlocking relationship with said first locking element to connect the baton and the accessory.

9. The baton and detachable accessory combination of claim 8, wherein said channel has a spiral shape of continuously increasing diameter such that as the pin and socket are rotated into locking engagement with one another, the spiral shape causes the bar and channel to engage each other with increasing locking force.

10. The baton and detachable accessory combination of claim 8, wherein said first locking element further includes a socket with a radial bar disposed therein.

11. The baton and detachable accessory combination of claim 10, wherein said second locking element further includes a pin adapted to be received in said socket such that together the pin and socket define a locking mechanism, said pin being defined by an axis extending along the length of the pin and said pin having a channel adapted to receive the bar, wherein said channel is on a spiraling incline relative to the axis of the pin.

12. An accessory connector in combination with a law enforcement baton and an accessory, the accessory connector adapted for mounting an accessory having a threaded end on the threaded end of a law enforcement baton, said connector comprising:

a. a first component adapted to be secured to one of said ends and having a first locking element, wherein said first component includes an internal thread adapted to engage the external threads of one of said threaded ends and wherein said first locking element includes a socket with a radial bar disposed therein; and b. a second component adapted to be secured to the other of said threaded ends and having a second, compatible locking element, said second locking element further includes a pin adapted to be received in said socket such that together the pin and socket define a locking mechanism, said pin being defined by an axis extending along the length of the pin and said pin having a channel adapted to receive the bar, wherein said channel is on a spiraling incline relative to the axis of the pin, wherein said second locking element may be selectively secured in an interlocking relationship with said first locking element to connect the baton and the accessory.

13. The baton, accessory and accessory connector combination of claim 12, wherein said channel has a spiral shape of continuously increasing diameter such that as the pin and socket are rotated into locking engagement with one another, the spiral shape causes the bar and channel to engage each other with increasing locking force.

* * * * *